United States Patent [19]

Teuber et al.

[11] Patent Number: 5,345,355
[45] Date of Patent: Sep. 6, 1994

[54] SLACK LIMITING TAB FOR A MAGNETIC TAPE CASSETTE

[75] Inventors: Vincent P. Teuber, Hastings; Qing Cai, Woodbury, both of Minn.

[73] Assignee: Minnesota Mining and Manufacturing Company, St. Paul, Minn.

[21] Appl. No.: 781,732

[22] Filed: Oct. 23, 1991

[51] Int. Cl.$^5$ .............................................. G11B 23/02
[52] U.S. Cl. .................................. 242/343.1; 360/132
[58] Field of Search ........................ 360/132; 242/199

[56] References Cited

U.S. PATENT DOCUMENTS

| | | | |
|---|---|---|---|
| 4,604,671 | 8/1986 | Oishi | 360/132 |
| 5,196,479 | 3/1993 | Laughner et al. | 525/67 |
| 5,232,962 | 8/1993 | Dershem et al. | 523/442 |

FOREIGN PATENT DOCUMENTS 0222992  8/1986  European Pat. Off. .

Primary Examiner—A. J. Heinz
Attorney, Agent, or Firm—Gary L. Griswold; Walter N. Kirn; David B. Kagan

[57] ABSTRACT

The present invention provides a magnetic recording tape cassette comprising: a housing having an access area; two reels, rotatably mounted within the housing; a length of magnetic tape having opposite end portions wound around each of the reels and a portion extending therebetween; a tape guiding surface for guiding the tape portion in extension between the reels, across the access area, and along a predefined path between at least one of the reels and the access area; at least one slack limiting tab having a contact end portion and a mounting region; the slack limiting tab comprising a flexible, resilient polymeric material having a $T_g$ of greater than about 140° C.; and mounting means in said housing for mounting said slack limiting tab in the housing such that the mounting region engages the mounting means, and the contact end portion is biased against the tape to press the tape against the tape guiding surface.

13 Claims, 3 Drawing Sheets

SLACK LIMITING TAB FOR A MAGNETIC TAPE CASSETTE

FIELD OF THE INVENTION

The present invention relates to magnetic tape cassettes of the type that have a length of tape with end portions wound around two reels rotatably mounted in a housing with a portion of the tape extending between the reels. Specifically, the present invention relates to improved tabs for limiting slack in the tape between the reels.

BACKGROUND OF THE INVENTION

Tape cassettes for use in magnetic recording and reproducing devices are typically of the type having a housing containing freely rotatably mounted reels on which is wound a magnetic tape. The tape extends between the reels and is guided across an access area, i.e., an access opening, in the housing. During use, as for example in a video recorder, the magnetic tape is withdrawn from the cassette housing out of the access area and wrapped or loaded about a guide drum. The guide drum is adjacent to a rotary magnetic head that scans tracks on the tape as the tape is moved about the guide drum. For effective use, the magnetic tape must be freely drawn out of the access area during the loading, recording, and reproducing modes; however, it must also be drawn out of the access area under controlled conditions such that it does not become excessively loose or slack.

Excessive looseness or slackness in the length of the magnetic tape extending between the reels can cause numerous problems. For example, if excessively loose or slack, magnetic tape typically does not become properly engaged by the magnetic head during use. This can lead to defective recording and/or reproducing operations. Furthermore, if excessively loose or slack, magnetic tape can jam within the cassette or within the recording and/or reproducing device, during use. Also, if excessively loose or slack, the extended run of magnetic tape can become damaged during storage or non-use of the tape cassette.

Excessive looseness or slackness in the magnetic recording tape can arise when the cassette is being transported or is otherwise separated from its associated recording and/or reproducing device. Although some cassettes have locks that restrict rotation of the reels when the cassette is not in such device, it is possible that one or both of the reels within the cassette housing can turn to unwind the tape and develop the undesirable slack condition. Excessive slackness in the tape can also occur when the tape is engaged within a recording and/or reproducing device. Typically, such a device has spindles that engage the two reels. If driving and braking of the reels during operation by these spindles is not synchronous, slack in the tape can develop.

Elimination of excessive looseness or slackness in the magnetic tape as it is drawn out of the access area is typically accomplished using a slack limiting device, such as a slack limiting tab. Slack limiting tabs are designed to press against the moving tape at, or close to, guides located at opposite ends of the access opening within the cassette housing. Slack limiting tabs are designed to provide sufficient tension and exert a restraining or tightening effect on the tape without generating too much friction, which could cause, for example, excessive wear. In this way, slack limiting tabs preload the magnetic tape so it does not inadvertently unwind.

A slack limiting tab typically includes a resilient, flexible strip, usually of metal or plastic. Typically, one end of a slack limiting tab is affixed to the cassette housing, while the other end, i.e., the free end which exerts the tension against the tape, is typically coated with a layer of a low friction material. The most commonly used slack limiting tabs are made of polyester or polypropylene. However, some cassettes experience excessively loose or slack tape during use, despite the presence of a slack limiting tab. Therefore, there is a need for a magnetic tape cassette that functions properly, without excessive looseness or slackness, throughout the life of the cassette.

SUMMARY OF THE INVENTION

The present invention provides an improved magnetic recording tape cassette having a slack limiting tab that provides relatively long-lasting protection against excessively loose or slack tape, particularly by comparison to typical previously known polymeric slack limiting tabs. The present invention is based on the discovery that excessively loose or slack tape can result when the commonly used polymeric slack limiting tabs, i.e., those made of polyester and polypropylene, become permanently deformed during use. That is, under certain environmental conditions, such as conditions of high temperature, commonly used slack limiting tabs become permanently deformed, e.g., bent. Deformed slack limiting tabs are less effective, and often ineffective, at eliminating excessive looseness or slackness in tapes.

It has been further discovered that this permanent deformation occurs during use because of inadequate viscoelastic properties, such as creep. That is, the commonly used polymeric slack limiting tabs experience undesirable creep, i.e., a gradual permanent deformation produced by a continued application of heat or stress, such that the magnetic recording tape experiences functional failure. Herein "functional failure" refers to any of a variety of conditions that result from excess slack in the tape. This can include tape jamming, tape breakage, poor recording, etc.

The slack limiting tabs of the present invention can withstand storage temperatures up to at least about 60° C., and operating temperatures up to at least about 40° C., without significant creep, i.e., permanent deformation. That is, these conditions can be tolerated by the magnetic recording tape cassettes using slack limiting tabs of the present invention without functional failure of the recording tape. Preferably, the slack limiting tabs of the present invention have a sufficient creep resistance, i.e., resistance to creep and permanent deformation, such that they can withstand operating temperatures up to about 40° C. for at least about 100 hours without the tape functionally failing. These conditions meet or exceed the most extreme conditions presently specified by cassette manufacturers.

According to the present invention there is provided a magnetic recording tape cassette including: a housing having an access area; two reels, rotatably mounted within the housing; a length of tape having opposite end portions wound around each of the reels and a portion extending therebetween; a tape guiding surface for guiding the tape portion in extension between the reels across the access area, and along a predefined path between at least one of the reels and the access area; at least one slack limiting tab having a contact end portion and a mounting region and comprising a flexible, resilient polymeric material as herein described; and a mounting means in the housing for mounting the slack limiting tab in the housing such that the mounting region engages the mounting means, and the contact end portion is positioned to engage, i.e., be biased against, the tape to press the tape against the tape guiding surface.

This engagement between the contact end portion of the slack limiting tab and the magnetic recording tape preferably occurs whether the slack limiting tab is in a generally flexed position or a generally relaxed position. Herein "relaxed position" refers to the position the slack limiting tabs adopt when the cassette is not in use and the magnetic tape is not under tension. In contrast, "flexed position" refers to the position the slack limiting tabs adopt when the cassette is in use and the magnetic tape is generally under tension.

The slack limiting tab of the present invention includes a flexible, resilient polymeric material capable of forming a film. Herein, a "flexible" slack limiting tab is one that is sufficiently capable of flexing and bending without permanent deformation of the tab, yet is sufficiently strong when pressed against the magnetic recording tape to transmit an effective pressure to press the tape against the tape guiding surface. Herein, a "resilient" slack limiting tab is one that is capable of recovering from a flexed position without experiencing permanent deformation.

The flexible, resilient polymeric material of the slack limiting tab of the present invention has desirable viscoelastic properties that enable the slack limiting tab to withstand relatively high temperatures and/or stresses typically encountered by slack limiting tabs, without significant permanent deformation. Such a material preferably has a creep value of less than about 0.5% strain at 100 hours under a load of $7.0 \times 10^5$ kg/m$^2$ at 44° C. Furthermore, such a material preferably has a glass transition temperature ($T_g$) of greater than about 140° C., and more preferably greater than about 150° C. Most preferably, the flexible, resilient polymeric material that forms the slack limiting tab of the present invention has a $T_g$ of less than about 300° C. Polymeric material such as this does not significantly creep, or at least does not creep to such an extent that there is significantly permanent deformation of the slack limiting tab.

Although the flexible, resilient polymeric material can be any polymeric material that meets these characteristics, it is preferably selected from the group consisting of polycarbonates, polyimides, polyetherimides, polyethersulfones, polysulfones, or reinforced polymeric materials, such as glass-filled polyesters and glass-filled polyurethanes. More preferably, the flexible, resilient polymeric material is a polycarbonate or polyimide material. Most preferably, it is a polycarbonate. A slack limiting tab comprising a polycarbonate material can also include coatings, adjuvants, minor amounts of other polymeric materials, etc.

Typically, and preferably, the thin, flat portion, or body, of the slack limiting tab is a unitary film structure. The flexible, resilient polymeric film preferably has a generally uniform thickness of about $7.6 \times 10^{-3}$ cm to $25 \times 10^{-3}$ cm, and more preferably about $1.3 \times 10^{-2}$ cm to $1.8 \times 10^{-2}$ cm.

BRIEF DESCRIPTION OF THE DRAWINGS

The present invention will be more thoroughly described with reference to the accompanying drawings.

DESCRIPTION OF THE PREFERRED EMBODIMENTS

As required, detailed descriptions of the present invention are provided herein. In general, the detailed descriptions are to be considered as exemplary only. Therefore, the invention is not to be interpreted as limited to the specific arrangements described, except as limited by the claims.

Figure 1:
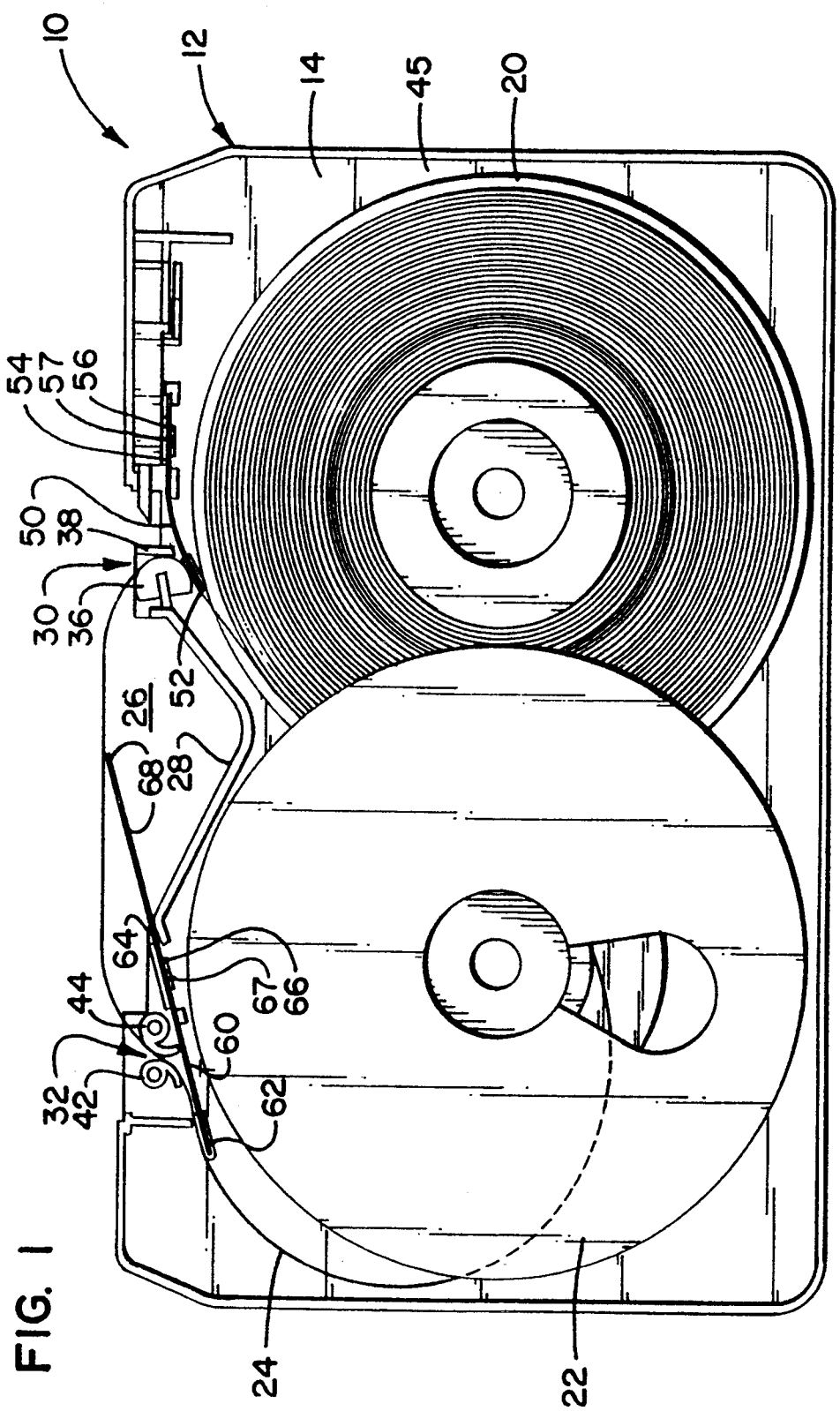
FIG. 1 is a top plan view showing the interior of a lower cassette housing section, with a lower molded side wall assembly, a take-up reel, a supply reel, a take-up reel slack limiting tab, and a supply reel slack limiting tab, of the present invention, wherein each slack limiting tab is in its relaxed position.

FIG. 1 illustrates a lower section of a magnetic recording tape cassette including two alternative embodiments of a slack limiting tab of the present invention. Referring to FIG. 1, a magnetic recording tape cassette 10 includes: a housing 12, which is made of a lower molded side wall assembly 14 and an upper mating molded side wall assembly (not shown); a supply reel 20; a take-up reel 22; and a length of magnetic recording tape 24 having opposite end portions wound around the reels 20 and 22 and a portion extending therebetween. The supply reel 20 and the take-up reel 22 are rotatably mounted within the housing 12, i.e., between the lower molded side wall assembly 14 and upper mating side wall assembly.

The housing 12 defines a tape access area 26 along the outer surface 28 of the housing 12. The magnetic recording tape 24 extends between the reels 20 and 22, and is guided across the access area 26 in the housing 12. During use, the magnetic recording tape 24 is withdrawn from the cassette housing 12 out of the access area 26 and wrapped or loaded about a guide drum within a recording and/or reproducing device (not shown). When the cassette 10 is not in use, the access area 26 is covered by a door (not shown) that can be pivoted open by the recording and/or reproducing device, thereby affording access to the tape 24 extending across the access area 26.

In addition to a housing, two rotatably mounted reels, and magnetic recording tape, a magnetic recording tape cassette typically further includes means for guiding the portion of the tape that is in extension between the reels across the access area, and along a predefined path between at least one of the reels and the access area. Often the path along which the tape is guided is a relatively tortuous path, at least between one of the reels and the access area. Preferably, the tape is guided along a predefined path between both the reels. Referring to FIG. 1, the magnetic recording tape cassette 10 further includes means 30 and 32 for guiding the tape 24 from the supply reel 20 across the access area 26 to the take-up reel 22. Each of guide means 30 and 32 includes at least one guiding surface for guiding the tape. For example, guide means 30 includes a radiused guide post 36 and a guide bar 38. Guide means 32 includes two radiused guide posts 42 and 44. The guide posts 36, 42, and 44, and the guide bar 38 can be molded into, or mounted on, the lower molded side wall assembly 14 of the housing 12. They generally project at right angles to the bottom 45 of the molded side wall assembly 14.

A magnetic recording tape cassette of the present invention contains at least one flexible, resilient slack limiting tab designed to provide better reduction in the amount of slack in a tape than can the polymeric slack limiting tabs presently known and used. In general, a slack limiting tab of the present invention possesses a contact end portion adapted to engage the tape and a mounting region adapted to engage a mounting means in the housing. The contact end portion is typically biased against the tape to press said tape against the tape guiding surface. This engagement between the contact end portion and the tape generally occurs whether the slack limiting tab is in a fully flexed position, a relaxed position, or some position therebetween.

Although not intending to be limiting, the mounting region of the slack limiting tabs of the present invention is typically located at the end of the slack limiting tab that is opposite the contact end portion (see the discussion with respect to FIG. 5 below). Alternative shapes of the slack limiting tabs of the present invention are possible, depending on the types of cassettes in which they are used. For example, the slack limiting tab can have a contact end portion, an opposite extended end portion, and a mounting region between the two end portions (see the discussion with respect to FIG. 4 below).

Referring to FIG. 1, a supply reel slack limiting tab 50, with a contact end portion 52 and a mounting region 54, is mounted in the housing 12 by mounting means 56. The mounting region 54 of the slack limiting tab 50 is adapted to engage the mounting means 56 of the lower molded side wall assembly 14 of the housing 12. The mounting means 56 is preferably a mounting projection 57 molded into the wall of the molded side wall assembly 14. The supply reel slack limiting tab 50 is shown in its relaxed position with the contact end portion 52 biased against the magnetic recording tape 24. Herein "relaxed position" refers to the position the slack limiting tabs adopt when the cassette is not in use and the magnetic tape is not under tension. Even in the relaxed position, however, the slack limiting tab is performing its function of exerting pressure against the tape to reduce slack.

The representative embodiment shown in FIG. 1 illustrates a second slack limiting tab. A take-up reel slack limiting tab 60, with a contact end portion 62 and a mounting region 64, is mounted in the housing 12 by mounting means 66. The mounting region 64 of the slack limiting tab 60 is adapted to engage the mounting means 66 of the lower molded side wall assembly 14 of the housing 12. The mounting means 66 is preferably a mounting projection 67 molded into the wall of the molded side wall assembly 14. The take-up reel slack limiting tab 60 is shown in its relaxed position with the contact end portion 62 biased against the magnetic recording tape 24. The take-up reel slack limiting tab 60 also possesses an end portion defining a projection 68 that extends into the access area 26. The take-up reel slack limiting tab 60 extends into the access area 26 with the end portion projection 68 for the purpose of preventing the tape from becoming statically attached to the housing. Thus, the projection 68 replaces a bar that is often molded into the housing to extend across the access area 26.

Figure 2:
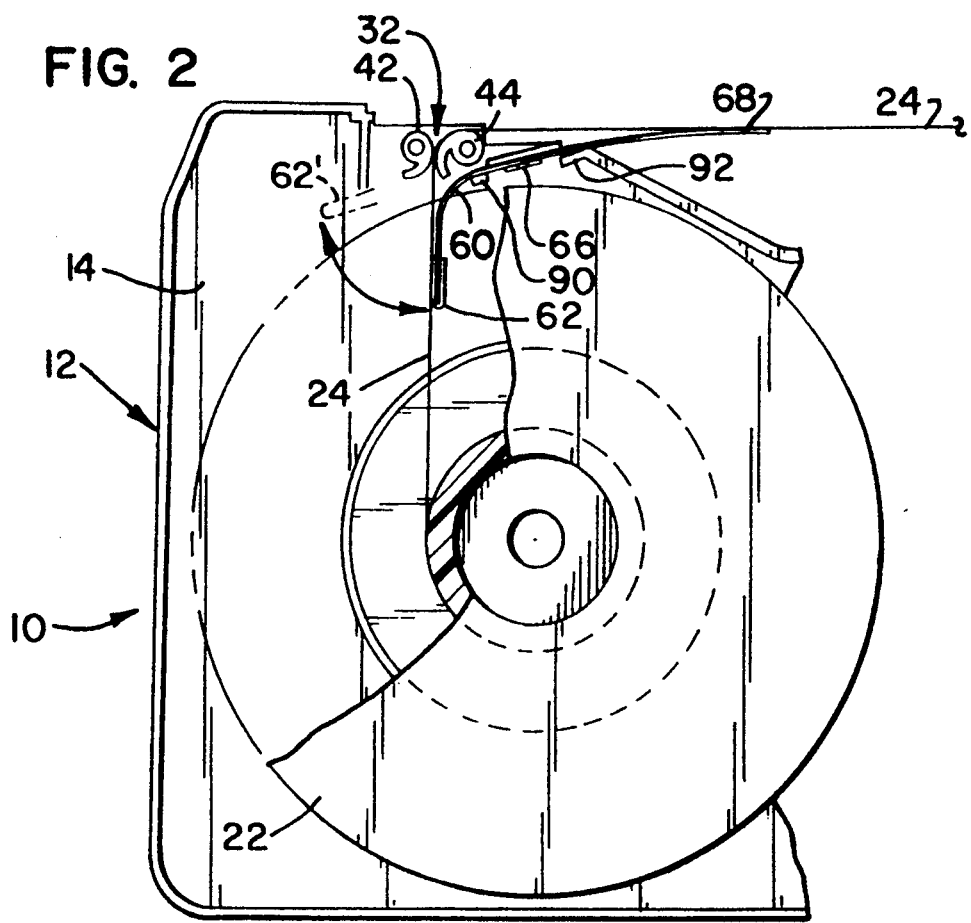
FIG. 2 is a fragmentary top plan view of the interior of the lower cassette housing section shown in FIG. 1 with a portion of the take-up reel cut away. The take-up reel slack limiting tab in FIG. 2 is shown in a flexed position.
Figure 3:
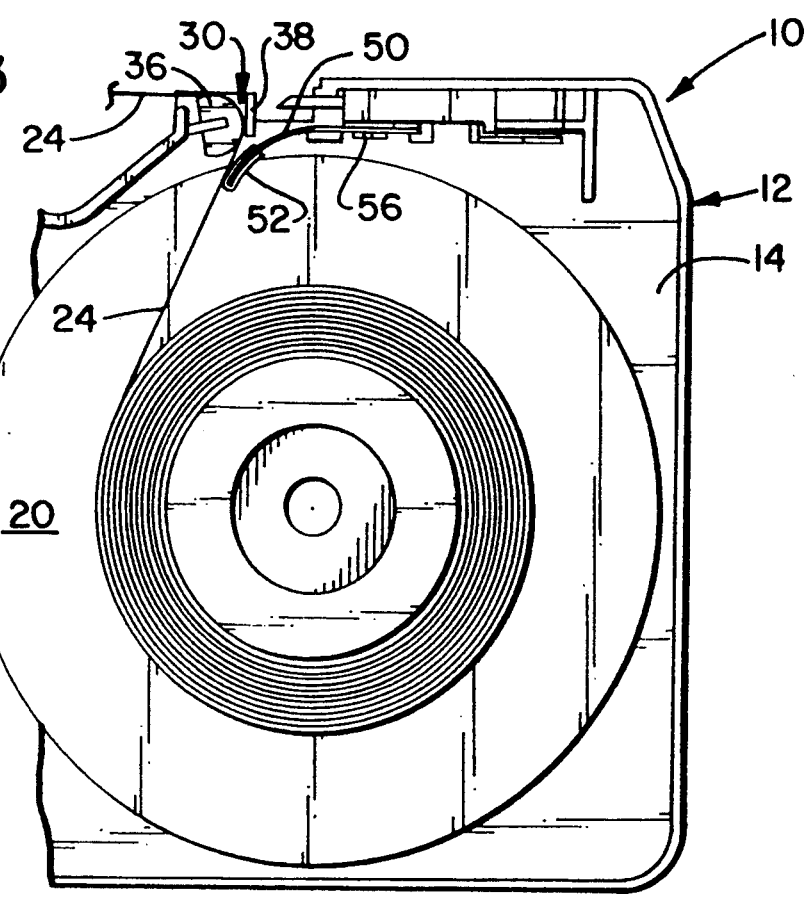
FIG. 3 is a fragmentary top plan view of the interior of the lower cassette housing section shown in FIG. 1 with the supply reel. The supply reel slack limiting tab in FIG. 3 is shown in a flexed position.

FIGS. 2 and 3, which illustrate partial views of the magnetic recording tape cassette 10 shown in FIG. 1, demonstrate flexed positions of the slack limiting tabs 50 and 60. Herein "flexed position" refers to the position the slack limiting tabs adopt when the cassette is in use and the magnetic tape is under tension.

FIG. 2 shows the take-up reel 22, with a portion cut away, prior to the transfer of the tape 24 from the supply reel, during use. The contact end portion 62 of the slack limiting tab 60 is shown engaged with, and biased against, the magnetic recording tape 24. At least because of the biased contact between the tape 24 and the slack limiting tab contact end portion 62, the slack limiting tab 60 is in a flexed position (the position shown in FIG. 2) prior to any tape being transferred to the take-up reel 22. During use, as the tape 24 is transferred from the supply reel 20 (FIGS. 1 and 3) and wound around the take-up reel 22, the slack limiting tab 60 relaxes toward its relaxed position (shown as the dotted line 62' representing the contact end portion 62 of slack limiting tab 60). The end portion projection 68 extends into the access area 26 and provides a means by which the tape is kept spaced apart from the housing.

FIG. 3 shows the supply reel 20 after a majority of the tape 24 has been removed therefrom and transferred to the take-up reel 22 (FIGS. 1 and 2), during use. The contact end portion 52 of the slack limiting tab 50 is shown engaged with, and biased against, the magnetic recording tape 24. Because of the biased contact between the tape 24 and the slack limiting tab contact end portion 52, as the tape 24 is removed under tension from the supply reel 20 during use, the slack limiting device 50 becomes flexed (the position shown in FIG. 3).

Typical polymeric slack limiting tabs can generally assume the relaxed and flexed positions shown in the figures and positions of greater and lesser flex than those shown; however, under certain undesirable environmental conditions, such as high temperatures, typical polymeric slack limiting tabs become permanently deformed. That is, they will often assume the flexed position, or a position approaching the flexed position permanently, even when removed from the cassette housing. In contrast, the slack limiting tabs of the present invention can withstand extended periods of undesirable environmental conditions without experiencing any permanent deformation. That is, a slack limiting tab of the present invention can be in its flexed position for an extended period of time at a relatively high temperature, i.e., at least up to about 40° C. for more than about 100 hours, without adopting the flexed position permanently, even when removed from the cassette housing.

Slack limiting tabs of the present invention are prepared from a flexible, resilient film-forming polymeric material. They are preferably of a unitary construction. They typically have an end portion adapted to engage a magnetic recording tape during use without detrimentally effecting the quality of the tape. This end portion is referred to herein as the contact end portion. Slack limiting tabs of the present invention also possess a mounting region for mounting in a cassette housing.

The slack limiting tabs of the present invention do not possess characteristics that lead to a significant amount of undesirable creep, i.e., a gradual permanent deformation produced by a continued application of heat or stress. That is, the slack limiting tabs of the present invention can withstand storage temperatures up to about 60° C., and operating temperatures up to about 40° C., without significant creep, i.e., permanent deformation, over an extended period of time. Preferably, the polymeric slack limiting tabs of the present invention can withstand operating temperatures up to about 40° C. for at least about 100 hours without the tape functionally failing.

The slack limiting tabs of the present invention are made of a flexible, resilient polymeric material that preferably possesses a creep value of less than about 0.5% strain at 100 hours under a load of $7.0 \times 10^5$ kg/m$^2$ at 44° C., as determined by following the procedure outlined in American Society for Testing and Materials (ASTM) D2990-77 test method, which is incorporated herein by reference. Briefly, this method describes how to measure the tensile, compressive, flexural creep, and creep-rupture of polymeric materials.

Furthermore, the flexible, resilient polymeric material that has the necessary characteristics to avoid undesirable creep preferably possesses a $T_g$ of greater than about 140° C., and more preferably greater than about 150° C. Most preferably, the flexible, resilient polymeric material of the slack limiting tab of the present invention has a $T_g$ of less than about 300° C.

Although the slack limiting tabs of the present invention can be formed from a variety of materials that possess the above-listed properties, they are preferably formed from a flexible, resilient material selected from the group consisting of polycarbonates, polyimides, polyetherimides, polysulfones, polyethersulfones, or reinforced polymeric materials, such as glass-filled polyesters and glass-filled polyurethanes. More preferably, the flexible, resilient polymeric material is a polycarbonate or a polyimide. A preferred polyimide material is a polyetherimide available under the trade name "Ultem" from General Electric Company. Preferred polycarbonate films are available under the trade name "Lexan" from General Electric Company. Most preferably, the flexible, resilient polymeric material is a polycarbonate, at least because of its low tendency to creep, exceptional viscoelastic properties, and ready availability in the form of a film.

Typically, and preferably, the slack limiting tab is of a unitary film structure. The flexible, resilient polymeric film has a generally uniform thickness of about $7.6 \times 10^{-3}$ cm to $25 \times 10^{-3}$ cm, and more preferably about $1.3 \times 10^{-2}$ cm to $1.8 \times 10^{-2}$ cm.

Figure 4:
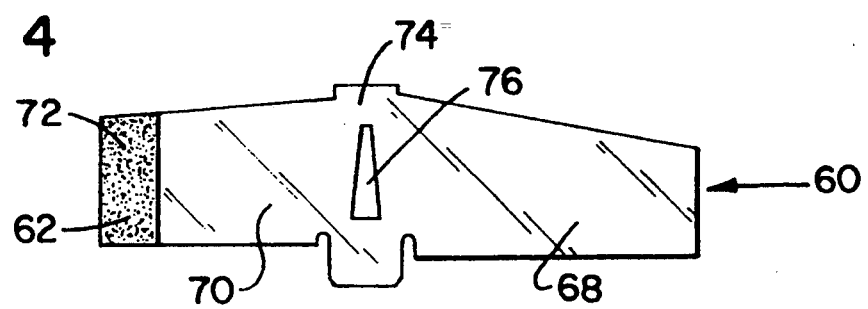
FIG. 4 is a plan view of an individual slack limiting tab (the take-up reel slack limiting tab) according to the present invention.
Figure 5:
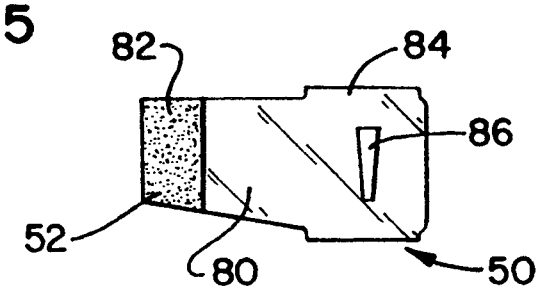
FIG. 5 is a plan view of an individual slack limiting tab (the supply reel slack limiting tab) according to the present invention.

As previously stated, the slack limiting tab mounting region can define an opposite end portion of the slack limiting tab (FIG. 5). Alternatively, it can be a central region of the slack limiting tab, for certain desired applications, as shown in FIG. 4. FIG. 4 illustrates the take-up reel slack limiting tab 60 shown in FIGS. 1 and 3, according to the present invention. As is best seen in FIG. 4, the slack limiting tab 60 includes a generally thin, flat portion 70 of a flexible, resilient polymeric material. The generally thin, flat portion 70 is coated at one end with a sheet 72 of a low friction polymeric material to form the contact end portion 62.

In this design, the slack limiting tab 60 includes a mounting region 74, as well as an end projection 68. The mounting region 74 is disposed between the contact end portion 62 and the end projection 68. Thus, although the slack limiting tab 60 includes an end portion defining a projection 68, which extends into the access area 26 (FIG. 1), not all slack limiting tabs contain such an extension. This particular slack limiting tab possesses such an extension because it is designed for advantageous operation in a professional format cassette such as a "Umatic" video cassette tape.

FIG. 5 illustrates the supply reel slack limiting tab 50 shown in FIGS. 1 and 3, according to the present invention. As does the slack limiting tab 60, the slack limiting tab 50 includes a generally thin, flat portion 80 of a flexible, resilient polymeric material. The generally thin, flat portion 80 is coated at one end with a sheet 82 of a low friction polymeric material to form the contact end portion 52.

This low friction polymeric material can be any of a variety of materials that can form a strong adhesive bond with the flexible, resilient polymeric material of the thin, flat portions (70 and 80), and that can frictionally engage magnetic recording tape without detrimentally effecting the quality and condition of the tape. Preferred low friction polymeric materials include polytetrafluoroethylene and ultrahigh molecular weight polyethylene. When ultrahigh molecular weight polyethylene is used for the sheet 72 and sheet 82, it is preferred that the ultrahigh molecular weight polyethylene be corona treated on the adhesive side before lamination to the thin, flat portions (70 and 80). The most preferred low friction polymeric material is an ultrahigh molecular weight polyethylene, at least because of its high wear resistance from magnetic tape contact friction. Thus, most preferably, the slack limiting tabs of the present invention consist primarily of a polycarbonate material with an end portion coated with an ultrahigh molecular weight polyethylene material. Although any appropriate adhesive can be used, a preferred adhesive for adhering the low friction polymeric material to the flexible, resilient polymeric material of the slack limiting tabs is an acrylate pressure sensitive adhesive.

A preferred ultrahigh molecular weight polyethylene is a conductive, carbon-powder filled ultra high molecular weight polyethylene commercially available as Dixon No. 954 from Dixon Industries Corp. A preferred acrylate pressure sensitive adhesive is commercially available as Scotch brand No. 976 Laminating Adhesive from Minnesota Mining and Manufacturing Company.

According to one preferred technique of making a polycarbonate slack limiting tab of the present invention having an ultra high molecular weight contact end portion, a suitably-sized strip of ultra high molecular weight polyethylene is laminated along one edge of a flexible, resilient polycarbonate film such that the strip is folded over and covers a narrow region on both sides of the film. Preferably, the ultra high molecular weight polyethylene is primed, e.g., primed using a corona treatment, in order to improve the adhesion of the polyethylene to the adhesive used to laminate the polyethylene to the film. The resulting composite is then cut, e.g., die cut, to the desired shape of the slack limiting tab in a manner such that the ultra high molecular weight polyethylene is positioned as the contact end portion of the slack limiting tab.

The manner in which a slack limiting tab of the present invention is mounted within a cassette housing can be any of a variety of well known arrangements or methods. Referring to FIG. 4, the mounting region 74 of the slack limiting tab 60 includes central opening 76. Similarly, referring to FIG. 5, the mounting region 84 of the slack limiting tab 50 includes a central opening 86. The central openings 76 and 86 are adapted to fit over a mounting projection in a cassette housing.

Referring again to FIG. 2, the slack limiting tab 60 is mounted to the cassette housing 12 by mounting means 66. Mounting means 66 is preferably a mounting projection 67 molded into the wall of the molded side wall assembly 14. The mounting projection 67 is shaped generally like the central opening in the slack limiting tab. The slack limiting tab 60 fits over the mounting projection 67, which frictionally receives and compressively holds the slack limiting tab 60, with the tab end projection 68 extending generally transverse to the path of the tape 24.

The slack limiting tab 60 is further retained in this mounting position by molded in bracing members 90 and 92. Although not shown in detail in the figures, these bracing members 90 and 92 are positioned opposite the molded mounting projection 67 of mounting means 66, and project at right angles to the bottom of the molded side wall assembly 14. These bracing members 90 and 92 further assure retention of the slack limiting tab 60 to the molded side wall assembly 14. A similar mode of mounting slack limiting tab 50 is shown in FIG. 3, modified somewhat because of the lack of a projection in the slack limiting tab 50, which is analogous to the projection 68 in the slack limiting tab 60. Such modes of mounting slack limiting tabs are generally well known in the art of magnetic recording tape cassette manufacture.

The invention has been described with reference to various specific and preferred embodiments and techniques. It should be understood, however, that many variations and modifications can be made while remaining within the spirit and scope of the invention.

What is claimed is:

1. A magnetic recording tape cassette comprising:
   (a) a housing having an access area;
   (b) two reels, rotatably mounted within said housing;
   (c) a length of magnetic tape having opposite end portions wound around each of said reels and a portion extending therebetween;
   (d) a tape guiding surface for guiding said tape portion in extension between said reels across said access area, and along a predefined path between at least one of said reels and said access area;
   (e) at least one slack limiting tab having a contact end portion and a mounting region; said slack limiting tab comprising a flexible, resilient polymeric material having a glass transition temperature of greater than about 140° C.; and
   (f) mounting means in said housing for mounting said slack limiting tab in said housing such that said mounting region engages said mounting means, and said contact end portion is biased against said tape to press said tape against said tape guiding surface.

2. The tape cassette of claim 1 wherein said slack limiting tab comprises a flexible, resilient polymeric material having a glass transition temperature of greater than about 150° C.

3. The tape cassette of claim 1 wherein said slack limiting tab comprises a flexible, resilient polymeric material having a creep value of less than about 0.5% strain at 100 hours under a load of $7.0 \times 10^5$ kg/m² at 44° C.

4. The tape cassette of claim 1 wherein said slack limiting tab is selected from the group consisting of polycarbonates, polyimides, polyetherimides, polysulfones, polyethersulfones, and reinforced polymeric materials.

5. The tape cassette of claim 4 wherein said slack limiting tab comprises a polycarbonate material or a polyetherimide material.

6. The tape cassette of claim 1 wherein said slack limiting tab comprises a polycarbonate material.

7. The tape cassette of claim 6 wherein said slack limiting tab comprises a polymeric material having a thickness of about $7.6 \times 10^{-3}$ cm to $25 \times 10^{-3}$ cm.

8. The tape cassette of claim 1 wherein said slack limiting tab comprises a flexible, resilient polymeric material having sufficient creep resistance to withstand storage temperatures up to at least about 60° C. without the tape functionally failing and to withstand operating temperatures up to about 40° C. for at least about 100 hours without the tape functionally failing.

9. The tape cassette of claim 8 wherein said slack limiting tab comprises a flexible, resilient material having a creep value of less than about 0.5% strain at 100 hours under a load of $7.0 \times 10^5$ kg/m² at 44° C.

10. The tape cassette of claim 8 wherein said slack limiting tab comprises a polycarbonate or a polyetherimide material.

11. The tape cassette of claim 8 wherein said slack limiting tab comprises a polycarbonate material.

12. The tape cassette of claim 1 wherein said slack limiting tab comprises a contact end portion coated with an ultrahigh molecular weight polyethylene material.

13. The tape cassette of claim 12 wherein said slack limiting tab comprises a polycarbonate material having a thickness of about $7.6 \times 10^{-3}$ cm to $25 \times 10^{-3}$ cm.

* * * * *